(12) United States Patent
Kruczek et al.

(10) Patent No.: US 12,713,238 B2
(45) Date of Patent: Aug. 18, 2026

(54) VERIFYING USER PREMISES EQUIPMENT IDENTITY WITH DEPLOYED FIRMWARE AND EXPIRED AUTHENTICATION

(71) Applicant: Charter Communications Operating, LLC, St. Louis, MO (US)

(72) Inventors: James Kruczek, Lone Tree, CO (US); Tyson Vinson, Denver, CO (US); Dan Mattox, Parker, CO (US); Ashish Ranjan, Lone Tree, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 287 days.

(21) Appl. No.: 18/658,696

(22) Filed: May 8, 2024

(65) Prior Publication Data

US 2025/0350943 A1 Nov. 13, 2025

(51) Int. Cl.

| | |
|---|---|
| ***H04W 12/069*** | (2021.01) |
| ***H04W 12/60*** | (2021.01) |
| ***H04W 12/63*** | (2021.01) |
| ***H04W 60/04*** | (2009.01) |

(52) U.S. Cl.

CPC ......... *H04W 12/069* (2021.01); *H04W 12/63* (2021.01); *H04W 12/66* (2021.01); *H04W 60/04* (2013.01)

(58) Field of Classification Search

CPC ... H04W 12/069; H04W 12/63; H04W 12/66; H04W 60/04; H04L 63/0823; H04L 63/107

See application file for complete search history.

(56) References Cited

U.S. PATENT DOCUMENTS

| | | | | |
|---|---|---|---|---|
| 9,842,335 | B2 * | 12/2017 | Hayhow | G06Q 20/38215 |
| 11,983,723 | B2 * | 5/2024 | Mercury | G06V 40/174 |

(Continued)

FOREIGN PATENT DOCUMENTS

| | | |
|---|---|---|
| WO | 2022098647 A1 | 5/2022 |

OTHER PUBLICATIONS

Schaad, J., et al., "Certificate Management over CMS (CMC)," Network Working Group, Request for Comments: 5272, Jun. 2008, 83 pages.

(Continued)

*Primary Examiner* — Siu M Lee
(74) *Attorney, Agent, or Firm* — Dority & Manning, P.A.

(57) ABSTRACT

An authentication request is received from a User Premises Equipment (UPE). The authentication request is responsive to expiration of a prior authentication certificate provided to the UPE. The authentication request comprises a set of metadata information elements. A subset of metadata information elements are selected from the set, comprising a static element descriptive of a UPE establishment event, and environmental elements indicative of a physical environment of the UPE. The static element is validated based on validation information. A trust score for the UPE is generated based on a comparison between the environmental elements and a UPE environmental profile descriptive of a known physical environment of a geographic area associated with the UPE. An authentication certificate is provided to the UPE based on the trust score being greater than a threshold trust score.

20 Claims, 3 Drawing Sheets

(56) References Cited

U.S. PATENT DOCUMENTS

| | | | | |
|---|---|---|---|---|
| 2018/0007059 | A1* | 1/2018 | Innes | G06F 21/6218 |
| 2023/0198780 | A1* | 6/2023 | Schneider | H04W 12/06<br>713/175 |

OTHER PUBLICATIONS

Pritikin, M., et al., "Enrollment over Secure Transport," Internet Engineering Task Force (IETF), Request for Comments: 7030, Oct. 2013, 53 pages.

* cited by examiner

VERIFYING USER PREMISES EQUIPMENT IDENTITY WITH DEPLOYED FIRMWARE AND EXPIRED AUTHENTICATION

BACKGROUND

User Premise Equipment (UPE) generally refers to devices that are deployed to the premises of a user (e.g., Internet of Things (IoT) devices, network devices, etc.). For example, UPE can refer to a router or modem device deployed to the residence of a user of a telecommunications service provider. When deployed, UPE typically connects to a Configuration Control Server (CCS) for initial configuration. During the initial configuration process, the UPE is provisioned with an authentication certificate or the like. When communicating with the CCS, or other network entities, the UPE can identify itself by providing the authentication certificate. Generally, authentication certificates are configured to expire after a set period of time.

SUMMARY

When the authentication certificate provisioned for a User Premises Equipment (UPE) (e.g., a router, modem, etc.) expires, the UPE can request a new authentication certificate from a computing system, such as a Configuration Control Server (CCS). The computing system can select a subset of metadata information elements from the request provided by the user. The computing system can evaluate the metadata information elements to verify the UPE's identity. Once verified, the computing system can provide a new authentication certificate to the UPE.

In one implementation, a method is provided. The method includes receiving, by a computing system, an authentication request from a User Premises Equipment (UPE), wherein the authentication request is responsive to expiration of a prior authentication certificate provided to the UPE, and wherein the authentication request comprises a set of metadata information elements. The method further includes selecting, by the computing system, a subset of metadata information elements from the set of metadata information elements, wherein the subset of metadata information elements comprises a static metadata information element descriptive of a UPE establishment event that occurred prior to provision of the prior authentication certificate to the UPE, and a plurality of environmental metadata information elements indicative of a physical environment of the UPE. The method further includes validating, by the computing system, the static metadata information element based on validation information descriptive of the UPE establishment event, etc. The method further includes generating, by the computing system, a trust score for the UPE based on a comparison between the plurality of environmental metadata information elements and a UPE environmental profile descriptive of a known physical environment of a geographic area associated with the UPE. The method further includes providing, by the computing system, an authentication certificate to the UPE based on the trust score being greater than a threshold trust score.

In another implementation, a computing system is provided. The computing system includes a memory, and processor device(s) coupled to the memory. The processor device(s) are configured to receive an authentication request from a UPE, wherein the authentication request is responsive to expiration of a prior authentication certificate provided to the UPE, and wherein the authentication request comprises a set of metadata information elements. The processor device(s) are further configured to select a subset of metadata information elements from the set of metadata information elements, wherein the subset of metadata information elements comprises a static metadata information element descriptive of a UPE establishment event that occurred prior to provision of the prior authentication certificate to the UPE, and a plurality of environmental metadata information elements indicative of a physical environment of the UPE. The processor device(s) are further configured to access validation information descriptive of the UPE establishment event to validate the static metadata information element. The processor device(s) are further configured to generate a trust score for the UPE based on a comparison between the plurality of environmental metadata information elements and a UPE environmental profile descriptive of a known physical environment of a geographic area associated with the UPE. The processor device (s) are further configured to provide an authentication certificate to the UPE based on the trust score being greater than a threshold trust score.

In another implementation, a non-transitory computer-readable storage medium is provided. The non-transitory computer-readable storage medium includes executable instructions to cause one or more processor devices to receive an authentication request from a UPE, wherein the authentication request is responsive to expiration of a prior authentication certificate provided to the UPE, and wherein the authentication request comprises a set of metadata information elements. The instructions are further to cause one or more processor devices to select a subset of metadata information elements from the set of metadata information elements, wherein the subset of metadata information elements comprises a static metadata information element descriptive of a UPE establishment event that occurred prior to provision of the prior authentication certificate to the UPE, and a plurality of environmental metadata information elements indicative of a physical environment of the UPE. The instructions are further to cause one or more processor devices to access validation information descriptive of the UPE establishment event to validate the static metadata information element. The instructions are further to cause one or more processor devices to generate a trust score for the UPE based on a comparison between the plurality of environmental metadata information elements and a UPE environmental profile descriptive of a known physical environment of a geographic area associated with the UPE. The instructions are further to cause one or more processor devices to provide an authentication certificate to the UPE based on the trust score being greater than a threshold trust score.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
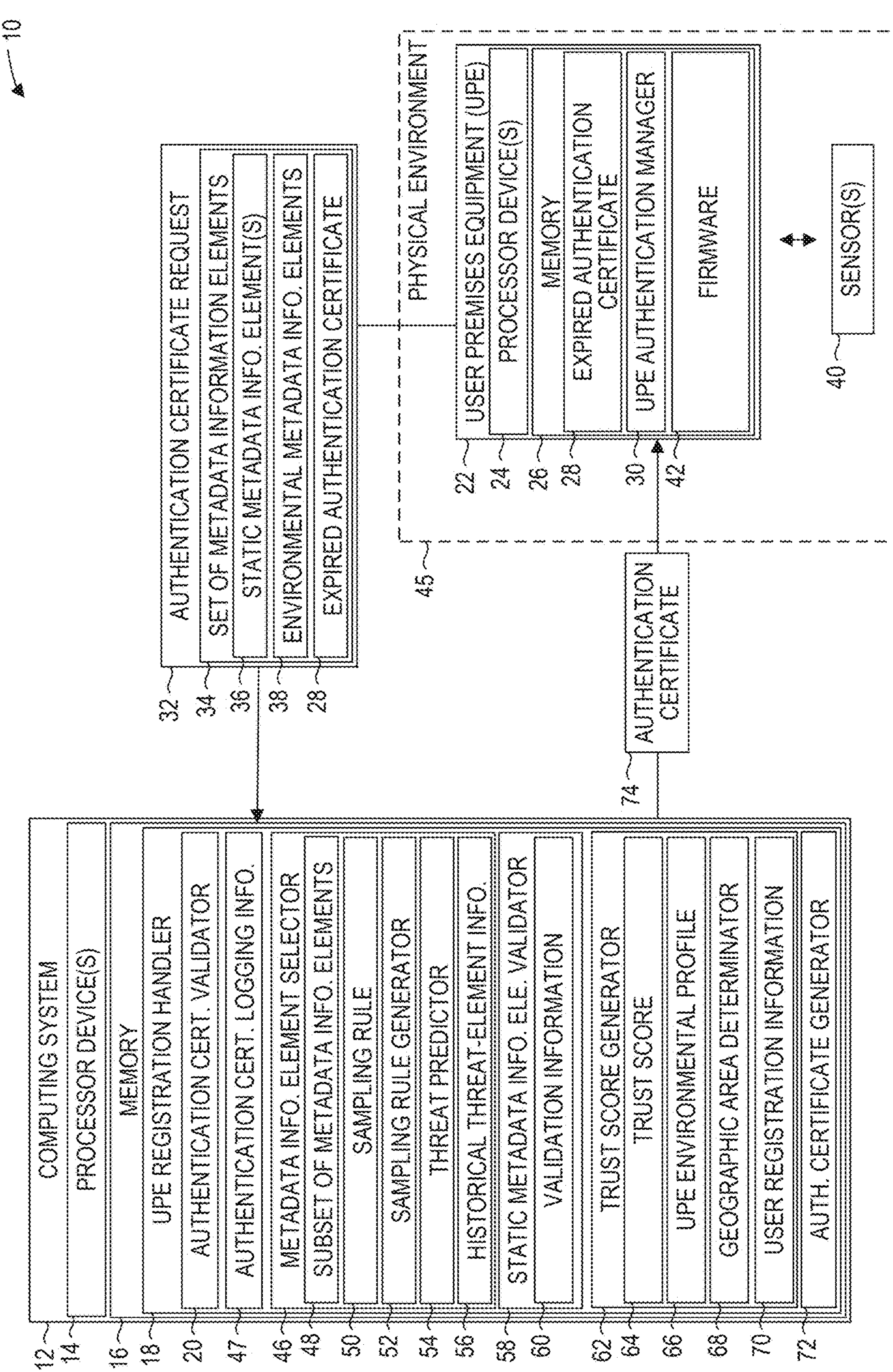
FIG. 1 is a block diagram of an environment suitable for verifying the identity of User Premises Equipment (UPEs) with deployed firmware and expired authentication certificates according to some implementations of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

User Premise Equipment (UPE) generally refers to devices that are deployed to the premises of a user (e.g., Internet of Things (IoT) devices, network devices, etc.). For example, UPE can refer to a router or modem device deployed to the residence of a user of a telecommunications service provider. When deployed, UPE typically connects to a Configuration Control Server (CCS) for initial configuration. During the initial configuration process, the UPE is provisioned with an authentication certificate or the like. When communicating with the CCS, or other network entities, the UPE can identify itself by providing the authentication certificate.

Authentication certificates primarily serve to defeat UPE impersonation attempts by malicious actors. More specifically, a popular attack vector for malicious actors is to impersonate a particular UPE when communicating with a server or other network entity associated with a service provider (e.g., a network service provider). To impersonate a UPE, a malicious actor will usually mimic certain identifying characteristics of the UPE that are easily discovered, such as a Media Access Control (MAC) address, an Internet Protocol (IP) address, a hardware ID (HWID), etc. For example, many of these identifying characteristics can be extracted from unencrypted communications intercepted by malicious actors. However, authentication certificates are provisioned to UPEs via fully encrypted channels that are prohibitively difficult to intercept. As such, authentication certificates effectively mitigate impersonation attempts by malicious actors.

To ensure that certificates remain secure, authentication certificates provided to UPEs are generally configured to expire after a set period of time. This is done to ensure that a stolen authentication certificate will not enable malicious actors to successfully impersonate UPEs indefinitely. UPEs can request new authentication certificates from the CCS to replace expired (or soon-to-expire) authentication certificates received previously. However, requests for new authentication certificates that fail to include a valid (i.e., non-expired) certificate are denied, as the CCS cannot accurately identify the requestor without a valid certificate. As such, most conventional UPEs are instructed to request a new authentication certificate prior to expiration of the last received authentication certificate.

UPEs frequently fail to acquire a new authentication certificate prior to expiration of the previous certificate. Such failures can be caused by network failures, cancellation of network services enabled by the UPE, loss of power, a factory reset of the UPE, corruption of UPE memory, etc. For example, assume a user temporarily switches from one network service provider that requires a modem to another network service provider that does not require a modem. Further assume that the user disconnects the modem while not in use, and that an authentication certificate provisioned for the modem expires while the modem is disconnected. If the user reconnects the modem, the modem will first attempt to acquire a new authentication certificate from the CCS. However, without an existing, non-expired authentication certificate, the CCS cannot verify the identity of the UPE and will reject the authentication certificate request, thus rendering the UPE non-operable. As such, a technique to securely verify the identity of UPEs with expired authentication certificates is greatly desired.

Accordingly, implementations described herein propose verifying the identity of user premises equipment with deployed firmware and expired authentication certificates. Specifically, a computing system (e.g., a CCS) can receive an authentication request from a UPE that is responsive to expiration of a prior authentication certificate provided to the UPE. The authentication request can include a set of metadata information elements. As described herein, a "metadata information element" can refer to any data or information that the UPE can generate or locally access. For example, a metadata information element can refer to a sensor reading from the UPE, configuration information for the UPE, certain events associated with the UPE, etc.

The computing system can select a subset of metadata information elements from the set of metadata information elements. For example, the computing system can determine a sampling rule based on a predicted threat actor. The computing system can then select the subset of metadata information elements by sampling the set of metadata information elements based on the sampling rule.

The subset of metadata information elements can include a static metadata information element. A "static" metadata information element can include static information that cannot (or should not) be modified or deleted. The static metadata information element can describe a UPE establishment event that occurred prior to provision of the prior authentication certificate to the UPE. Examples of UPE establishment events can include a manufacturing event during which the UPE was manufactured, a configuration event during which the UPE was initially configured, a deployment event during which the UPE was deployed, etc.

The subset of metadata information elements can also include a plurality of environmental metadata information elements. The environmental metadata information elements can be indicative of a physical environment of the UPE. Examples of environmental metadata information elements can include a barometric pressure sensor reading, a temperature sensor reading, ambient noise information, geographic coordinates, etc.

The computing system can access validation information that describes the UPE establishment event. The computing system can use the validation information to validate the static metadata information element. For example, assume that the static metadata information element is descriptive of a date upon which manufacturing of the UPE was completed. The validation information can include the same date. As the manufacturing date can be difficult for malicious actors to extract, validation of the static metadata information element can contribute towards verifying the identity of the UPE.

Once the static metadata information element is verified, the computing system can generate a trust score for the UPE. The trust score for the UPE can be based on a comparison between the plurality of environmental metadata information elements and a UPE environmental profile descriptive of an expected physical environment for a geographic area associated with the UPE. Based on the trust score being greater than a threshold score, the computing system can provide a new authentication certificate to the UPE.

More specifically, the computing system can generate and maintain UPE environmental profiles for different physical environments. To do so, the computing system can collect environmental metadata information elements from UPEs deployed to a particular physical environment. The computing system can generate a UPE environmental profile which indicates averages or typical ranges of environmental metadata information elements for the physical environment (e.g., temperature, humidity, barometric pressure, etc.). The computing system can then determine whether the physical environment of the UPE indicated by the environmental metadata information elements matches the known physical environment of the geographic area associated with the UPE.

For example, assume that the UPE is associated with a user with a primary residence in the Southeast United States. The computing system can retrieve a UPE environmental profile descriptive of a known physical environment for the Southeast United States (e.g., hot, humid, sunny, etc.), and can compare the environmental metadata information elements provided by the user to the UPE environmental profile. If the environmental metadata information elements do not match the UPE environmental profile (e.g., substantial differences in temperature, humidity, etc.), the computing system can generate a relatively low trust score for the UPE that is lower than the threshold score.

Based on the trust score, the computing system can generate an authentication certificate for the UPE. The computing system can then provide the authentication certificate to the UPE for subsequent identity verification. In such fashion, implementations described herein enable accurate and security identity verification without requiring a valid authentication certificate. In other words, implementations described herein enable re-authentication of UPEs with expired authentication while mitigating, or eliminating, the risk of inadvertently authenticating a malicious entity impersonating the UPE.

Implementations described herein provide a number of technical effects and benefits. As one example technical effect and benefit, successful intrusion attempts by malicious actors can require the expenditure of substantial resources to repair (e.g., alerting users of data breaches, governmental fines, deployment of computing resources (e.g., power, memory, storage, compute cycles, etc.) to implement additional security measures, etc.). However, implementations described herein can substantially mitigate, or eliminate, a potential threat vector for malicious actors by accurately verifying UPE identity. In turn, by mitigating intrusion attempts by malicious actors, implementations described herein can substantially reduce or eliminate the expenditure of computational resources caused by successful intrusion attempts.

FIG. 1 is a block diagram of an environment suitable for verifying the identity of UPEs with deployed firmware and expired authentication certificates according to some implementations of the present disclosure. A computing environment 10 includes a computing system 12. The computing environment 10 can be any type or manner of computing environment implemented by one or more different entities. The computing environment 10 can include any type or manner of computing device, network device, network infrastructure (e.g., transceivers, splitters, cable, etc.), UPEs, etc. For example, the computing environment 10 can be an environment implemented by a network service provider (e.g., an internet service provider, a telecommunications service provider, etc.), and can include various devices and infrastructure that collectively enable provision of network services.

The computing system 12 can include processor device(s) 14 and memory 16. In some implementations, the computing system 12 may be a computing system that includes multiple computing devices. Alternatively, in some implementations, the computing system 12 may be one or more computing devices within a computing environment that includes multiple distributed devices and/or systems. Similarly, the processor device(s) 14 may include any computing or electronic device capable of executing software instructions to implement the functionality described herein.

The memory 16 can be or otherwise include any device(s) capable of storing data, including, but not limited to, volatile memory (random access memory, etc.), non-volatile memory, storage device(s) (e.g., hard drive(s), solid state drive(s), etc.). In particular, the memory 16 can include a containerized unit of software instructions (i.e., a "packaged container"). The containerized unit of software instructions can collectively form a container that has been packaged using any type or manner of containerization technique.

The containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 16 can include a UPE registration handler 18. The UPE registration handler 18 can handle initial provision, validation, verification, and re-provision of authentication certificates for UPEs. To do so, the UPE registration handler 18 can include an authentication certificate validator 20. The authentication certificate validator 20 can validate authentication certificates provided to the computing system 12. For example, if an authentication certificate is received by the UPE registration handler 18, the authentication certificate validator 20 can determine whether the authentication certificate is valid.

The computing environment 10 can include a UPE 22. The UPE 22 can include processor device(s) 24 and a memory 26 as described with regards to the processor device(s) 14 and memory 16 of the computing system 12, respectively. The memory 26 of the UPE 22 can include an expired authentication certificate 28. The expired authentication certificate 28 can be an authentication certificate previously provisioned to the UPE 22 by the UPE registration handler 18 that has since expired. For example, the expired authentication certificate 28 may be configured to expire on a date that has since passed. For another example, the expired authentication certificate 28 may have been configured to expire after being utilized to verify a number of transactions that has since been met.

The UPE 22 can include a UPE authentication manager 30. The UPE authentication manager 30 can determine that the expired authentication certificate 28 is expired. The UPE authentication manager 30 can then generate an authentication certificate request 32 and provide the authentication certificate request 32 to the UPE registration handler 18. The authentication certificate request 32 can include a set of metadata information elements 34. The set of metadata information elements 34 can include static metadata information element(s) 36 and environmental metadata information elements 38.

The set of metadata information elements 34 can include any type of data or information that the UPE can generate or locally access. For example, a metadata information element can refer to a sensor reading from the UPE, configuration information for the UPE, certain events associated with the UPE, etc. For another example, a metadata information element can include one or more sensor readings from sensor(s) 40. The sensor(s) 40 can be environmental sensor(s) that are built into the UPE or are otherwise located within the same physical environment as the UPE and accessible to the UPE via local signaling. The In particular, the static metadata information element(s) 36 can include static information that cannot (or should not) be modified or deleted. The static metadata information element(s) 36 can describe a UPE establishment event that occurred prior to provision of the prior authentication certificate to the UPE 22. Examples of UPE establishment events can include a manufacturing event during which the UPE 22 was manufactured, a configuration event during which the UPE 22 was initially configured, a deployment event during which the UPE 22 was deployed, etc.

In some implementations, the UPE establishment event described by the static metadata information element(s) 36 can be a manufacturing event during which the UPE 22 was manufactured. For example, during the manufacturing event, some static information (e.g., a manufacturing date, a random value, etc.) can be stored to a non-volatile memory, such as read-only memory (ROM), of the memory 26 of the UPE 22. The static metadata information element(s) 36 can include some (or all) of the static information stored to the non-volatile memory.

Additionally, or alternatively, in some implementations, the UPE establishment event described by the static metadata information element(s) 36 can be a configuration event during which the UPE 22 was last configured. The UPE 22 can store information descriptive of the configuration event. In some implementations, the set of static metadata information element(s) can include information descriptive of parameters changed during the configuration event, the changes made to the parameters, and/or parameters that were not changed during the configuration event. Configuration of the UPE 22 can occur at multiple instances over time to iteratively update various aspects of the UPE 22 (e.g., to apply firmware updates, to provide new encryption schemes, etc.).

For example, if an identifier for the UPE 22 was changed during the configuration event, the UPE 22 can store information descriptive of the differences between the prior and current MAC addresses for the UPE 22. For another example, assume that the UPE 22 includes firmware 44 that was updated to a current version during the configuration event. The UPE 22 can store information descriptive of the difference between the prior firmware version of the UPE 22 and the current firmware version of the UPE 22 (e.g., a difference of 0.05 between firmware versions 1.10 and 1.15).

Additionally, or alternatively, in some implementations, the UPE establishment event described by the static metadata information element(s) 36 can be a deployment event during which the UPE 22 was last deployed. A UPE 22 can be "deployed" when it is installed or otherwise activated on the premises of a user to which the UPE 22 is assigned. For example, if the UPE 22 is a cable modem for users, the UPE 22 can be "deployed" when installed at a user's residence by a technician. The UPE 22 can store information descriptive of the deployment event. For example, the UPE 22 can store a time at which the deployment event occurred, a duration of the deployment event, an identifier for a technician that performed the deployment, etc.

In some implementations, the static metadata information element(s) 36 can include information descriptive of parameters changed during the configuration event, the changes made to the parameters, and/or parameters that were not changed during the configuration event. For example, if an identifier for the UPE 22 was changed during the configuration event, the UPE 22 can store information descriptive of the differences between the prior and current MAC addresses for the UPE 22. For another example, assume that the UPE 22 includes firmware 44 that was updated to a current version during the configuration event. The UPE 22 can store information descriptive of the difference between the prior firmware version of the UPE 22 and the current firmware version of the UPE 22 (e.g., a difference of 0.05 between firmware versions 1.10 and 1.15).

As described previously, the set of metadata information elements 34 can also include the plurality of environmental metadata information elements 38. The environmental metadata information elements 38 can be indicative of a physical environment 45 of the UPE 22. As described herein, the "physical environment" of a UPE generally refers to a climate and/or other environmental factors that are associated with the physical location of the UPE. Examples of environmental metadata information elements can include a barometric pressure sensor reading, a temperature sensor reading, ambient noise information, geographic coordinates, etc.

In some implementations, the environmental metadata information elements 38 can describe a barometric pressure for the physical environment 45 in which the UPE 22 is located. For example, the sensor(s) 40 can include a barometric pressure sensor. The UPE 22 can request a barometric pressure sensor reading from the sensor(s) 40 to include in the environmental metadata information elements 38. Additionally, or alternatively, in some implementations, the UPE can request sensor readings from other types of sensors from the sensor(s) 40, such as an atmospheric quality sensor, temperature sensor, humidity sensor, light sensor, etc.

In some implementations, the environmental metadata information elements 38 can describe a specific room or enclosure in which the UPE 22 is located. For example, assume that the UPE 22 is located in a closet of a user's residence, and as such, rarely receives any light. The environmental metadata information elements 38 can indicate an average quantity of light measured by the UPE 22 over the last week. If a malicious actor impersonating the UPE indicates that the UPE measured an average quantity of light, the UPE registration handler 18 can determine that the authentication certificate request 32 is being provided by a malicious actor.

Returning to the computing system 12, the UPE registration handler 18 can utilize the authentication certificate validator 20 to determine whether the expired authentication certificate 28 is expired. In some implementations, the authentication certificate validator 20 can determine whether the expired authentication certificate 28 is expired based on authentication certificate logging information 47. The authentication certificate logging information 47 can include information descriptive of the expired authentication certificate 28, such as a time at which the expired authentication certificate 28 was provided to the UPE 22, the configured expiration time for the expired authentication certificate 28, etc.

Upon validating that the expired authentication certificate 28 is expired with the authentication certificate validator 20, the UPE registration handler 18 can attempt to verify the identity of the UPE 22. If the identity of the UPE 22 cannot be verified, the UPE registration handler 18 can refrain from providing a new authentication certificate to the UPE 22. Conversely, if the set of metadata information elements 34 is sufficient to verify the identity of the UPE 22, the UPE registration handler 18 can provide a new authentication certificate to the UPE 22.

To verify the identity of the UPE 22, the UPE registration handler 18 can include a metadata information element selector 46. In some implementations, the metadata information element selector 46 can select a subset of metadata information elements 48 from the set of the metadata information elements 34. Alternatively, in some implementations, the metadata information element selector 46 can select each of the set of metadata information elements 34 for inclusion in the subset of metadata information elements 48.

In some implementations, the metadata information element selector 46 can select the subset of metadata information elements 48 based on a sampling rule 50. The sampling rule 50 can be generated using a sampling rule generator 52. In some implementations, the sampling rule generator 52 can generate the sampling rule 50 based on a threat predictor 54, which can predict types of threats likely to be encountered by the UPE 22 based on historical threat information 56. The types of threats predicted by the threat predictor 54 can refer to a type of malicious actor (e.g., an automated actor, such as a botnet, a state-sponsored actor, etc.) and/or a type of threat vector (e.g., a UPE imitation attempt, a social engineering attempt, etc.).

For example, assume that the historical threat information 56 indicates that malicious actors originating from a certain geographic area have recently made a large number of intrusion attempts by imitating a particular type of UPE that includes the UPE 22. If the certain geographic area is consistent among the intrusion attempts (e.g., each request includes similar environmental metadata information elements), the sampling rule generator 52 can generate a sampling rule 50 that samples elements from the environmental metadata information elements 38 that describe the physical environment of the UPE 22.

The UPE registration handler 18 can include a static metadata information element validator 58. The static metadata information element validator 58 can validate the static metadata information element(s) 36 based on validation information 60. The validation information 60 can describe the UPE establishment event that occurred prior to provision of the expired authentication certificate 28 to the UPE 22.

In some implementations, the UPE establishment event can be a manufacturing event during which the UPE 22 was manufactured. The static metadata information element(s) 36 can include information descriptive of the manufacturing event, such as a date of manufacture, initial framework version at manufacture, a number stored to the memory of the UPE 22 at manufacture, a manufacture location, manufacturing factory, vendor names, part numbers, model numbers, etc. The validation information 60 can also describe the manufacturing event. For example, if the static metadata information element(s) 36 describes a date of manufacture, the validation information 60 can describe the same date of manufacture. The static metadata information element validator 58 can validate the static metadata information element(s) 36 by determining that the validation information 60 matches the static metadata information element(s) 36.

Additionally, or alternatively, the UPE establishment event can be a configuration event during which the UPE 22 was last configured. The static metadata information element(s) 36 can include information descriptive of the configuration event, such as initial values for parameters, current values for parameters, differences between configuration versions, firmware name, firmware version control commit identifiers, firmware library versions, etc. The validation information 60 can also describe the configuration event. For example, if the static metadata information element(s) 36 describes an initial firmware version number, the validation information 60 can describe the initial firmware version number. Additionally, or alternatively, in some implementations, the UPE establishment event can be a deployment event during which the UPE 22 was last deployed (e.g., a location at which the UPE 22 was last deployed, a time at which the UPE 22 was deployed, etc.).

The UPE registration handler 18 can include a trust score generator 62. The trust score generator 62 can generate a trust score 64 for the UPE 22 based on a comparison between the environmental metadata information elements 38 and a UPE environmental profile 66. The trust score 64 can describe a likelihood that the authentication certificate request originates from a malicious actor impersonating the UPE 22.

The trust score generator 62 can generate the trust score 64 based on a comparison between the UPE environmental profile 66 and the environmental metadata information elements 38. The environmental metadata information elements 38 can indicate a physical environment of the UPE. Examples of environmental metadata information elements can include temperature measurements, barometric pressure measurements, fan speeds, processor or memory clock speeds, etc. In some implementations, the environmental metadata information elements 38 can describe average measurements over a period of time (e.g., an average temperature over the past five minutes, etc.) or a maximum measurement over a period of time.

In some implementations, the trust score generator 62 can generate the trust score 64 based on the authentication certificate request 32. More specifically, the trust score generator 62 can compare message characteristics of the authentication certificate request 32 (e.g., TLS or SSL version, HTTP or similar connection protocol version, HTTP user agent, TCP port, packet hop count, response time, etc.) with prior message characteristics described by the UPE environmental profile 66.

Additionally, or alternatively, in some implementations, the UPE environmental profile 66 can describe a known physical environment for the UPE 22. Specifically, the trust score generator 62 can iteratively build the UPE environmental profile 66 based on sensor readings received from the UPE 22 over time. For example, the UPE environmental profile 66 can describe average temperatures, light exposure, fan speeds, etc. over a certain period of time.

Additionally, or alternatively, in some implementations, the UPE environmental profile 66 can describe a known physical environment of a geographic area associated with the UPE 22. As described herein, a geographic area can be "associated" with the UPE 22 if the UPE 22 has been assigned to the geographic area or is otherwise expected to be located in the geographic area. For example, if the UPE 22 is installed on the premises of a user, the geographic area in which the user is located can be associated with the UPE 22.

In some implementations, the trust score generator 62 can include a geographic area determinator 68. The geographic area determinator 68 can determine a geographic area associated with the UPE 22 based on user registration information 70. The user registration information 70 can indicate a geographic area of a user associated with the UPE 22. For example, assume that the UPE 22 is a network device (e.g., a router, modem, etc.) deployed to the premises of a user to implement network services. The user registration information 70 can indicate a geographic area of the user (e.g., a state, geographic region, county, etc.). The geographic area determinator 68 can determine the geographic area for the UPE 22 based on the user registration information 70 for the user associated with the UPE 22.

In some implementations, the geographic area determinator 68 can obtain the UPE environmental profile 66 based on a known physical environment of the geographic area associated with the UPE 22. For example, assume that the UPE 22 is located in the southeast United States. The geographic area determinator 68 can first determine that the UPE 22 is located in the southeast United States. The geographic area determinator 68 can then generate the UPE environmental profile 66 based on a plurality of initial environmental metadata information elements from a variety of UPEs located within the southeast United States. In other words, the geographic area determinator 68 can receive environmental information from a large number of UPEs located within the same geographic environment to build an expected "range" of environmental values to be expected for the physical environment of a UPE deployed to that geographic area.

The UPE registration handler 18 can include an authentication certificate generator 72. The authentication certificate generator 72 can generate an authentication certificate 74 based on the trust score 64 being greater than a threshold trust score. The authentication certificate generator 72 can provision the UPE 22 with the authentication certificate 74.

Figure 2:
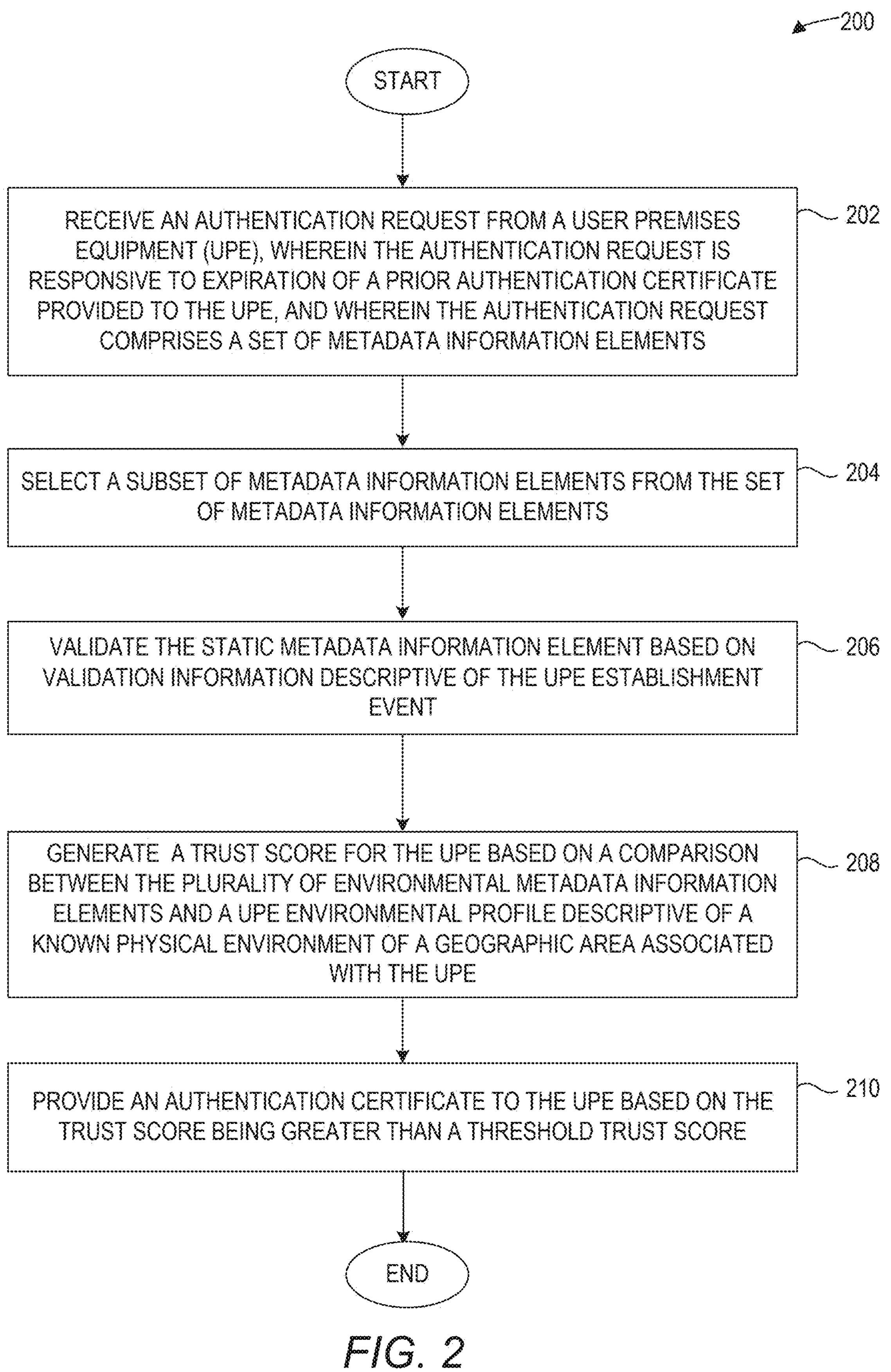
FIG. 2 depicts a flow chart diagram of an example method to verify the identity of UPEs with deployed firmware and expired authentication certificates according to some implementations of the present disclosure.

FIG. 2 depicts a flow chart diagram of an example method 200 to verify the identity of UPEs with deployed firmware and expired authentication certificates according to some implementations of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can receive an authentication request from a UPE. The authentication request can be responsive to expiration of a prior authentication certificate provided to the UPE. The authentication request can include a set of metadata information elements.

In some implementations, prior to receiving the authentication request, the computing system can receive a plurality of initial environmental metadata information elements from a plurality of UPEs located within the geographic area. The computing system can generate the UPE environmental profile descriptive of the expected physical environment for the geographic area associated with the UPE.

At 204, the computing system can select a subset of metadata information elements from the set of metadata information elements. The subset of metadata information elements can include a static metadata information element descriptive of a UPE establishment event that occurred prior to provision of the prior authentication certificate to the UPE. The subset of metadata information elements can include a plurality of environmental metadata information elements indicative of a physical environment of the UPE.

In some implementations, the UPE establishment event can be a manufacturing event during which the UPE was manufactured. Prior to receiving the authentication request, the computing system can obtain manufacturing information descriptive of a manufacturing date for the UPE. The computing system can store the manufacturing information as the validation information descriptive of the UPE establishment event.

Additionally, or alternatively, in some implementations, the UPE establishment event can be a configuration event during which the UPE was last configured. Prior to receiving the authentication request, the computing system can obtain configuration information descriptive of prior values applied to configuration parameters of the UPE during the configuration event. The computing system can store the validation information descriptive of the UPE establishment event based on the configuration information. In some implementations, the prior values can include an initial firmware version number for firmware installed to the UPE.

Additionally, or alternatively, in some implementations, the UPE establishment event can be a deployment event during which the UPE was last deployed.

In some implementations, to select the subset of metadata information elements, the computing system can determine the geographic area associated with the UPE. The computing system can determine that the UPE environmental profile is available for the geographic area associated with the UPE. In some implementations, to determine the geographic area, the computing system can identify a user account to which the UPE is assigned. The computing system can obtain user registration information for the user. The user registration information can be indicative of the geographic area associated with the UPE.

In some implementations, to obtain the user registration information, the computing system can obtain logging information from one or more intermediate network devices located within the geographic area. The computing system can, based on the logging information, identify one or more occurrences prior to receiving the authentication request in which the intermediate network device received information from the UPE.

In some implementations, to select the subset of metadata information elements, the computing system can perform a threat analysis to identify one or more types of threat actors. The computing system can generate a sampling rule based on the one or more types of threat actors. The computing system can use the sampling rule to select the subset of metadata information elements from the set of metadata information elements.

At 206, the computing system can validate the static metadata information element based on validation information descriptive of the UPE establishment event.

At 208, the computing system can generate a trust score for the UPE based on a comparison between the plurality of environmental metadata information elements and a UPE environmental profile descriptive of a known physical environment of a geographic area associated with the UPE.

At 210, the computing system can provide an authentication certificate to the UPE based on the trust score being greater than a threshold trust score.

Figure 3:
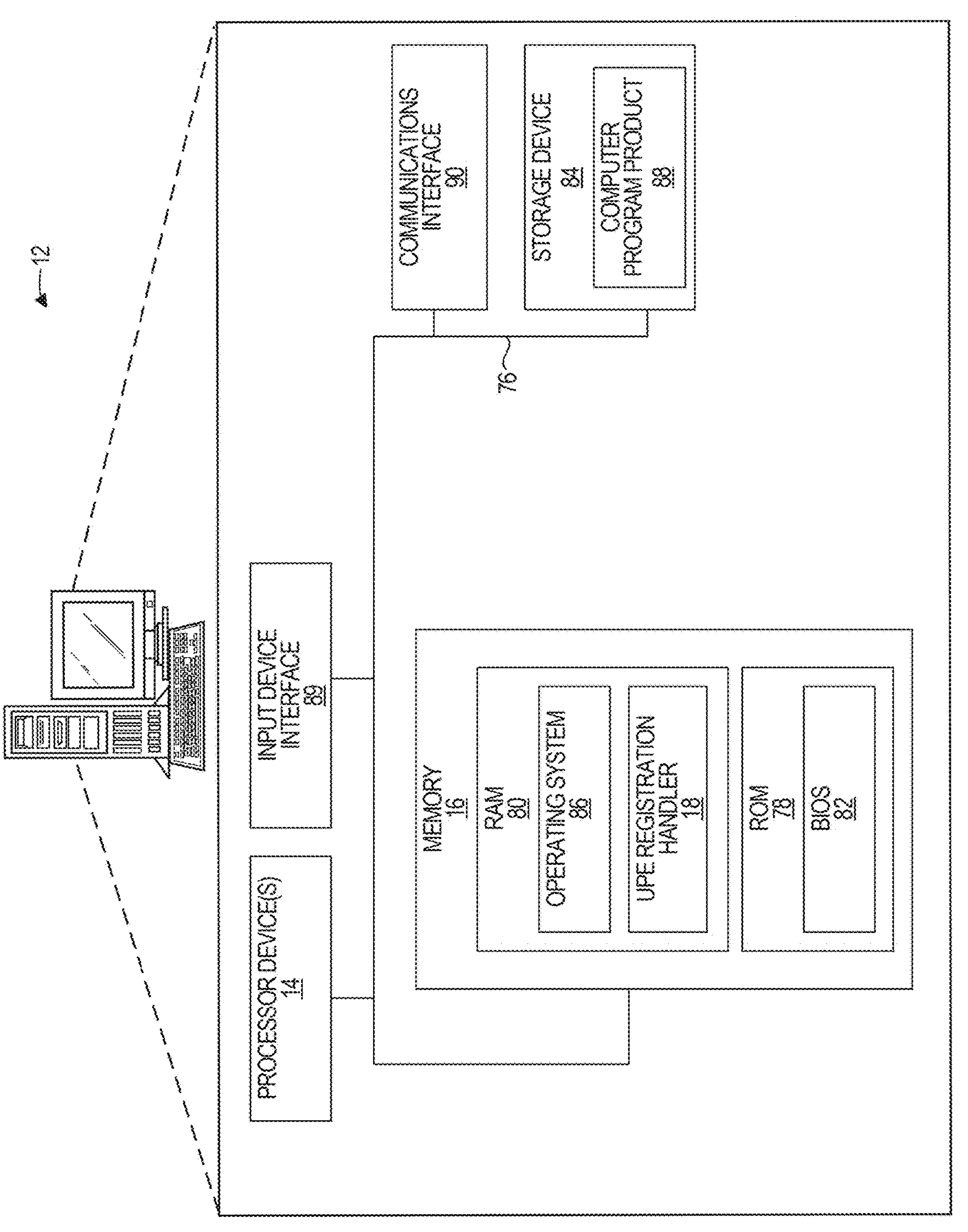
FIG. 3 is a block diagram of the computing system suitable for implementing examples according to one example.

FIG. 3 is a block diagram of the computing system 12 suitable for implementing examples according to one example. The computing system 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 12 includes the processor device(s) 14, the memory 16, and a system bus 76. The system bus 76 provides an interface for system components including, but not limited to, the memory 16 and the processor device(s) 14. The processor device(s) 14 can be any commercially available or proprietary processor.

The system bus 76 may be any of several types of bus structures that may further interconnect to a memory bus (with or without a memory controller), a peripheral bus, and/or a local bus using any of a variety of commercially available bus architectures. The memory 16 may include non-volatile memory 78 (e.g., read-only memory (ROM), erasable programmable read-only memory (EPROM), electrically erasable programmable read-only memory (EEPROM), etc.), and volatile memory 80 (e.g., random-access memory (RAM)). A basic input/output system (BIOS) 82 may be stored in the non-volatile memory 78 and can include the basic routines that help to transfer information between elements within the computing system 12. The volatile memory 80 may also include a high-speed RAM, such as static RAM, for caching data.

The computing system 12 may further include or be coupled to a non-transitory computer-readable storage medium such as the storage device 84, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 84 and other drives associated with computer-readable media and computer-usable media may provide non-volatile storage of data, data structures, computer-executable instructions, and the like.

A number of modules can be stored in the storage device 84 and in the volatile memory 80, including an operating system 86 and one or more program modules, such as the UPE registration handler 18, which may implement the functionality described herein in whole or in part. All or a portion of the examples may be implemented as a computer program product 88 stored on a transitory or non-transitory computer-usable or computer-readable storage medium, such as the storage device 84, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the UPE registration handler 18 in the volatile memory 80, may serve as a controller, or control system, for the computing system 12 that is to implement the functionality described herein.

Because the UPE registration handler 18 is a component of the computing system 12, functionality implemented by the UPE registration handler 18 may be attributed to the computing system 12 generally. Moreover, in examples where the UPE registration handler 18 comprises software instructions that program the processor device(s) 14 to carry out functionality discussed herein, functionality implemented by the UPE registration handler 18 may be attributed herein to the processor device(s) 14.

An operator, such as the user, may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 89 that is coupled to the system bus 76 but can be connected by other interfaces such as a parallel port, an Institute of Electrical and Electronic Engineers (IEEE) 1394 serial port, a Universal Serial Bus (USB) port, an IR interface, and the like. The computing system 12 may also include a communications interface 90 suitable for communicating with the network as appropriate or desired. The computing system 12 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a computing system, an authentication request from a User Premises Equipment (UPE), wherein the authentication request is responsive to expiration of a prior authentication certificate provided to the UPE, and wherein the authentication request comprises a set of metadata information elements;

selecting, by the computing system, a subset of metadata information elements from the set of metadata information elements, wherein the subset of metadata information elements comprises:

a static metadata information element descriptive of a UPE establishment event that occurred prior to provision of the prior authentication certificate to the UPE; and a plurality of environmental metadata information elements indicative of a physical environment of the UPE;

validating, by the computing system, the static metadata information element based on validation information descriptive of the UPE establishment event;

generating, by the computing system, a trust score for the UPE based on a comparison between the plurality of environmental metadata information elements and a UPE environmental profile descriptive of a known physical environment of a geographic area associated with the UPE; and providing, by the computing system, an authentication certificate to the UPE based on the trust score being greater than a threshold trust score.

2. The method of claim 1, wherein selecting the subset of metadata information elements from the set of metadata information elements comprises:

determining, by the computing system, the geographic area associated with the UPE; and determining, by the computing system, that the UPE environmental profile is available for the geographic area associated with the UPE.

3. The method of claim 2, wherein determining the geographic area associated with the UPE comprises:

identifying, by the computing system, a user account to which the UPE is assigned; and obtaining, by the computing system, user registration information for the user, wherein the user registration information is indicative of the geographic area associated with the UPE.

4. The method of claim 3, wherein obtaining the user registration information for the user further comprises:

obtaining, by the computing system, logging information from intermediate network devices located within the geographic area; and based on the logging information, identifying, by the computing system, one or more occurrences prior to receiving the authentication request in which the intermediate network devices received information from the UPE.

5. The method of claim 1, wherein, prior to receiving the authentication request, the method comprises:

receiving, by the computing system, a plurality of initial environmental metadata information elements from a plurality of UPEs located within the geographic area; and generating, by the computing system, the UPE environmental profile descriptive of the known physical environment for the geographic area associated with the UPE.

6. The method of claim 1, wherein the UPE establishment event comprises:

a manufacturing event during which the UPE was manufactured;

a configuration event during which the UPE was last configured; or a deployment event during which the UPE was last deployed.

7. The method of claim 6, wherein the UPE establishment event comprises the manufacturing event during which the UPE was manufactured; and wherein, prior to receiving the authentication request, the method comprises:

obtaining, by the computing system, manufacturing information descriptive of a manufacturing date for the UPE; and storing, by the computing system, the manufacturing information as the validation information descriptive of the UPE establishment event.

8. The method of claim 6, wherein the UPE establishment event comprises the configuration event during which the UPE was last configured; and wherein, prior to receiving the authentication request, the method comprises:

obtaining, by the computing system, configuration information descriptive of prior values applied to configuration parameters of the UPE during the configuration event; and storing, by the computing system, the validation information descriptive of the UPE establishment event based on the configuration information.

9. The method of claim 8, wherein the prior values comprise an initial firmware version number for firmware installed to the UPE.

10. The method of claim 1, wherein selecting the subset of metadata information elements from the set of metadata information elements comprises:

performing, by the computing system, a threat analysis to identify one or more types of threat actors;

generating, by the computing system, a sampling rule based on the one or more types of threat actors; and using, by the computing system, the sampling rule to select the subset of metadata information elements from the set of metadata information elements.

11. A computing system, comprising:

one or more processor devices configured to:

receive an authentication request from a User Premises Equipment (UPE), wherein the authentication request is responsive to expiration of a prior authentication certificate provided to the UPE, and wherein the authentication request comprises a set of metadata information elements;

select a subset of metadata information elements from the set of metadata information elements, wherein the subset of metadata information elements comprises:

a static metadata information element descriptive of a UPE establishment event that occurred prior to provision of the prior authentication certificate to the UPE; and a plurality of environmental metadata information elements indicative of a physical environment of the UPE;

access validation information descriptive of the UPE establishment event to validate the static metadata information element;

generate a trust score for the UPE based on a comparison between the plurality of environmental metadata information elements and a UPE environmental profile descriptive of a known physical environment of a geographic area associated with the UPE; and provide an authentication certificate to the UPE based on the trust score being greater than a threshold trust score.

12. The computing system of claim 11, wherein selecting the subset of metadata information elements from the set of metadata information elements comprises:

determining the geographic area associated with the UPE; and determining that the UPE environmental profile is available for the geographic area associated with the UPE.

13. The computing system of claim 12, wherein determining the geographic area associated with the UPE comprises:

identifying a user account to which the UPE is assigned; and obtaining user registration information for the user, wherein the user registration information is indicative of the geographic area associated with the UPE.

14. The computing system of claim 13, wherein obtaining the user registration information for the user further comprises:

obtaining logging information from intermediate network devices located within the geographic area; and based on the logging information, identifying one or more occurrences prior to receiving the authentication request in which the intermediate network devices received information from the UPE.

15. The computing system of claim 11, wherein, prior to receiving the authentication request, the one or more processor devices are configured to:

receive a plurality of initial environmental metadata information elements from a plurality of UPEs located within the geographic area; and generate the UPE environmental profile descriptive of the known physical environment for the geographic area associated with the UPE.

16. The computing system of claim 11, wherein the UPE establishment event comprises:

a manufacturing event during which the UPE was manufactured;

a configuration event during which the UPE was last configured; or a deployment event during which the UPE was last deployed.

17. The computing system of claim 16, wherein the UPE establishment event comprises the manufacturing event during which the UPE was manufactured; and wherein, prior to receiving the authentication request, the one or more processor devices are configured to:

obtain manufacturing information descriptive of a manufacturing date for the UPE; and store the manufacturing information as the validation information descriptive of the UPE establishment event.

18. The computing system of claim 16, wherein the UPE establishment event comprises the configuration event during which the UPE was last configured; and wherein, prior to receiving the authentication request, the one or more processor devices are configured to:

obtain configuration information descriptive of prior values applied to configuration parameters of the UPE during the configuration event; and store the validation information descriptive of the UPE establishment event based on the configuration information.

19. The computing system of claim 18, wherein the prior values comprise an initial firmware version number for firmware installed to the UPE.

20. A non-transitory computer-readable storage medium that includes executable instructions configured to cause one or more processor devices to:

receive an authentication request from a User Premises Equipment (UPE), wherein the authentication request is responsive to expiration of a prior authentication certificate provided to the UPE, and wherein the authentication request comprises a set of metadata information elements;

select a subset of metadata information elements from the set of metadata information elements, wherein the subset of metadata information elements comprises:

a static metadata information element descriptive of a UPE establishment event that occurred prior to provision of the prior authentication certificate to the UPE; and a plurality of environmental metadata information elements indicative of a physical environment of the UPE;

access validation information descriptive of the UPE establishment event to validate the static metadata information element;

generate a trust score for the UPE based on a comparison between the plurality of environmental metadata information elements and a UPE environmental profile descriptive of a known physical environment of the UPE; and provide an authentication certificate to the UPE based on the trust score being greater than a threshold trust score.

* * * * *